United States Patent
Shima et al.

(10) Patent No.: US 6,887,511 B1
(45) Date of Patent: *May 3, 2005

(54) METHOD FOR PREPARING ELECTRODE MATERIAL FOR LITHIUM BATTERY

(75) Inventors: Masaki Shima, Kobe (JP); Hiromasa Yagi, Nishinomiya (JP); Hisaki Tarui, Kobe (JP); Hiroaki Ikeda, Kobe (JP); Masahisa Fujimoto, Osaka (JP); Shin Fujitani, Kobe (JP); Yoichi Domoto, Ikoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 311 days.

This patent is subject to a terminal disclaimer.

(21) Appl. No.: 10/111,078

(22) PCT Filed: Oct. 20, 2000

(86) PCT No.: PCT/JP00/07299

§ 371 (c)(1),
(2), (4) Date: Apr. 19, 2002

(87) PCT Pub. No.: WO01/29913

PCT Pub. Date: Apr. 26, 2001

(30) Foreign Application Priority Data

Oct. 22, 1999 (JP) ............................................ 11-301679
Jan. 12, 2000 (JP) ....................................... 2000-003644

(51) Int. Cl.⁷ ................................................ H01M 6/00
(52) U.S. Cl. ........................ 427/58; 427/535; 29/623.1; 29/623.5; 429/236; 429/245; 429/231.95
(58) Field of Search ............................. 29/623.1, 623.5; 429/236, 245, 231.95; 427/58, 533, 534, 535

(56) References Cited

U.S. PATENT DOCUMENTS

| | | | | | |
|---|---|---|---|---|---|
| 5,431,963 A | * | 7/1995 | Rzad et al. | ........ | 427/534 |
| 5,631,100 A | | 5/1997 | Yoshino et al. | | |
| 6,132,477 A | * | 10/2000 | Warren | ........ | 29/623.1 |
| 6,180,868 B1 | * | 1/2001 | Yoshino et al. | ........ | 136/244 |
| 6,214,061 B1 | * | 4/2001 | Visco et al. | ........ | 29/623.5 |
| 6,242,129 B1 | * | 6/2001 | Johnson | ........ | 429/162 |
| 6,398,824 B1 | * | 6/2002 | Johnson | ........ | 29/623.1 |
| 6,488,721 B1 | * | 12/2002 | Carlson | ........ | 29/623.5 |
| 6,685,804 B1 | * | 2/2004 | Ikeda et al. | ........ | 204/192.12 |

FOREIGN PATENT DOCUMENTS

| | | |
|---|---|---|
| EP | 0 855 752 A2 | 7/1998 |
| JP | 59-16535 A | 1/1984 |
| JP | 61-34931 A | 2/1986 |
| JP | 4-137525 A | 5/1992 |
| JP | 5-308051 A | 11/1993 |
| JP | 7-302588 A | 11/1995 |
| JP | 7-307152 A | 11/1995 |
| JP | 9-213339 A | 8/1997 |
| JP | 11-135130 A | 5/1999 |
| JP | 11-233116 A | 8/1999 |
| JP | 2000-12089 A | 1/2000 |
| JP | 2000-100429 A | 4/2000 |

* cited by examiner

*Primary Examiner*—Bret Chen
(74) *Attorney, Agent, or Firm*—Kubovcik & Kubovcik

(57) ABSTRACT

A method for preparing an electrode material for a lithium battery, characterized in that a noncrystalline silicon thin film that serves as an active material is deposited on a substrate.

19 Claims, 1 Drawing Sheet

METHOD FOR PREPARING ELECTRODE MATERIAL FOR LITHIUM BATTERY

TECHNICAL FIELD

The present invention relates to a method for preparing an electrode material for a lithium battery, a method for fabricating an electrode for a lithium battery, and also to a method for constructing a lithium battery and a method for constructing a rechargeable lithium battery, respectively using the electrode material or the electrode obtainable from the aforementioned method.

BACKGROUND ART

The battery performance of rechargeable lithium batteries recently under intensive research and development, such as charge-discharge voltage, cycle life characteristics or storage characteristics, depends largely upon the types of the electrodes used. This has led to the attempts to better battery performance by improving electrode active materials.

The use of metallic lithium for the negative active material, although possible to construct a battery with high energy density per weight and volume, presents a problem that the lithium deposited on charge grows into dendrite which could cause internal short-circuiting.

Rechargeable lithium batteries are reported (Solid State Ionics, 113–115, p57 (1998)) which use an electrode consisting of aluminum, silicon, tin or the like that is electrochemically alloyed with lithium on charge. Among these, a silicon electrode provides a particularly high theoretical capacity and is promising as a high-capacity negative electrode. For this reason, various rechargeable batteries using silicon for the negative electrode are proposed (Japanese Patent Laying-Open No. Hei 10-255768). However, such alloying negative electrodes fail to provide sufficient cycle characteristics since alloys, as electrode active materials, are themselves pulverized on charge and discharge to reduce current-collecting capabilities.

DISCLOSURE OF THE INVENTION

It is an object of the present invention to provide a method for preparing an electrode material for a lithium battery, a method for fabricating an electrode for a lithium battery, and also provide a method for constructing a lithium battery and a method for constructing a rechargeable lithium battery, respectively using the electrode material or the electrode obtainable from the aforementioned method.

The claimed inventions are now described. The matters common to plural claims are described hereinafter as those of the "present invention".

A first aspect of the present invention is a method for preparing an electrode material for a lithium battery, characterized in that a thin film of noncrystalline silicon that serves as active material, such as a microcrystalline silicon thin film, is deposited on a substrate.

In general, silicon is roughly classified by its crystallinity into amorphous silicon, microcrystalline silicon, polycrystalline silicon and single crystal silicon. The term "noncrystalline silicon", as used herein, is meant to encompass amorphous silicon and microcrystalline silicon and preclude polycrystalline silicon and single crystal silicon, and refers to silicon with a structure which does not have a long-range order on the order of mm but has a short-range order on the order of $\mu$m or below. Silicon is identified as being in the amorphous form when Raman spectroscopy detects the substantial absence of a peak around 520 $cm^{-1}$ corresponding to a crystalline region and as being in the microcrystalline form when Raman spectroscopy detects the substantial presence of a peak around 520 $cm^{-1}$ corresponding to the crystalline region and a peak around 480 $cm^{-1}$ corresponding to an amorphous region. Hence, the microcrystalline silicon consists substantially of a crystalline region and an amorphous region. Silicon is identified as being in the single crystal or polycrystalline form when Raman spectroscopy detects the substantial absence of a peak around 480 $cm^{-1}$ which corresponds to the amorphous region.

In the present invention, a size of a crystalline region in the microcrystalline silicon thin film is preferably 0.5 nm or above, in terms of a crystallite size calculated from an X-ray diffraction spectrum and the Scherrer equation.

The procedure to calculate the crystallite size from the X-ray diffraction spectrum and Scherrer equation is described at page 375 in Thin-Film Handbood (1st Ed., edited by the Thin-Film 131 Committee of the Japan Society for the Promotion of Science, published by Ohmsha).

The crystallite size is preferably 0.5 nm or above, as stated above, more preferably 1 nm or above. A minimum-size crystalline region is illustrated by a three-dimensional crystalline region which is about 3 atoms long in each dimensional direction, i.e., contains about 27 atoms regularly arranged therein.

The aforestated crystallite size calculated from the X-ray diffraction spectrum and Scherrer equation does not necessarily correspond in value to a crystallite size determined by microscopical observation, for example, using a transmission electron microscope. The crystalline region may take the form that is elongated in a specific direction, e.g., in a thickness direction. In such an instance, the crystalline region may have a thickness dimension of about 10 $\mu$m, for example.

In the present invention, when the microcrystalline silicon thin film is analyzed by Raman spectroscopy, a ratio in intensity of the peak around 480 $cm^{-1}$ to the peak around 520 $cm^{-1}$ (around 480 $cm^{-1}$/around 520 $cm^{-1}$) is preferably 0.05 or above.

More preferably, the aforementioned peak intensity ratio is 0.1 or above. An upper limit of the peak intensity ratio is not particularly set. The substantial detection of the presence of the peak around 480 $cm^{-1}$ corresponding to an amorphous region is enough. The peak around 480 $cm^{-1}$ corresponding to an amorphous region is known to shift by about 10 $cm^{-1}$. Also, the peak around 520 $cm^{-1}$ corresponding to a crystalline region is known to shift by about 5 $cm^{-1}$. Since the peak around 480 $cm^{-1}$ is a broad peak, a foot of this peak in some cases expands close to 520 $cm^{-1}$. In such an instance, the peak intensity ratio is calculated by taking the hight of the peak around 520 $cm^{-1}$ as a peak intensity without subtracting the expanding portion of the peak.

In the present invention, a CVD, sputtering, spraying or vapor evaporation process may be utilized to deposit the noncrystalline silicon thin film, for example.

The preparation method in accordance with the first aspect of the present invention can be illustrated by a specific embodiment characterized as including supplying raw material containing silicon atoms either in the form of a gas or in the form of a powder from a vapor phase so that a thin film of noncrystalline silicon that serves as active material is deposited on a substrate.

In the deposition of the noncrystalline silicon thin film, a hydrogen gas, in addition to the gas- or powder-form raw material, may be supplied. In this case, the noncrystalline silicon thin film may contain hydrogen.

In the case where the noncrystalline silicon thin film contains hydrogen, a hydrogen concentration in the thin film may be 0.001 atomic % or higher, for example. The hydrogen concentration can be determined by a secondary ion mass spectrometry (SIMS).

The preparation method in accordance with the first aspect of the present invention can be illustrated by another embodiment characterized as including evacuating an interior of a closed chamber to a high vacuum of 1 Pa or below, introducing a gas of raw material containing Si—H bonds into the chamber using a hydrogen gas as a carrier gas, and allowing the raw material to decompose by a glow discharge induced by application of a radio frequency wave so that a thin film of noncrystalline silicon that serves as active material is deposited on a substrate.

The preparation method in accordance with the first aspect of the present invention can be illustrated by a further embodiment characterized as including evacuating an interior of a closed chamber to a high vacuum of 1 Pa or below, introducing an argon (Ar) gas into the chamber, and sputtering a silicon (Si) target by a glow discharge induced by application of a radio frequency wave so that a thin film of noncrystalline silicon that serves as active material is deposited on a substrate.

The preparation method in accordance with the first aspect of the present invention can be illustrated by a further embodiment characterized as including evacuating an interior of a closed chamber to a high vacuum of 1 Pa or below, and allowing a silicon (Si) target to melt and evaporate by an electron beam so that a thin film of noncrystalline silicon that serves as active material is deposited on a substrate.

In either of the above-described preparation methods, the substrate may be heated.

In the preparation method of the present invention, the substrate may be pretreated at its surface by plasma or ion irradiation before the noncrystalline silicon thin film is deposited thereon. Such a pretreatment improves adhesion of the silicon thin film to the substrate.

The plasma irradiation may be carried out using a hydrogen or argon plasma, for example. The ion irradiation may be carried out using a hydrogen or argon ion, for example.

The electrode material of the present invention is suitable for use as a negative electrode material for a lithium battery, and particularly suitable for use as a negative electrode material for a rechargeable lithium battery.

In the present invention, the substrate preferably serves as a current collector. In such an instance, an interlayer for improving adhesion may be provided to overlie the current collector and then the noncrystalline silicon thin film is deposited on the interlayer.

A second aspect of the present invention is a method for fabricating an electrode for a lithium battery, which is characterized in that a thin film of active material that is alloyable with lithium is deposited on a current collector by a thin-film forming process which supplies raw material from a vapor phase.

The thin film of active material may be deposited such as by a CVD, sputtering, spraying or vapor evaporation process.

The thin film of active material may be composed of at least one material that can produce compounds or solid solutions with lithium, selected from elements from Groups IIB, IIIB, IVB and VB of the periodic table, and oxides and sulfides of transition metal elements from Periods 4, 5 and 6 of the periodic table.

In the present invention, examples of elements from Groups IIB, IIIB, IVB and VB of the periodic table that can produce compounds or solid solutions with lithium include carbon, aluminum, silicon, phosphorus, zinc, gallium, germanium, arsenic, cadmium, indium, tin, antimony, mercury, thallium, lead and bismuth. Specific examples of transition metal elements from Periods 4, 5 and 6 of the periodic table include scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum series elements, hafnium, tantalum, tungsten, rhenium, osmium, iridium, platinum, gold and mercury.

Preferred among the above-listed elements is at least one selected from carbon, silicon, germanium, tin, lead, aluminum, indium, zinc, cadmium, bismuth and mercury. Silicon or germanium is particularly preferred among them.

In the second aspect, the active material is preferably deposited in the form of a noncrystalline thin film. Specific examples of such noncrystalline thin films include noncrystalline silicon, microcrystalline silicon, amorphous silicon, noncrystalline germanium, microcrystalline germanium, amorphous germanium, noncrystalline silicon-germanium alloy, microcrystalline silicon-germanium alloy and amorphous silicon-germanium alloy thin films.

Also in the second aspect, the current collector may be pretreated at its surface by plasma or ion irradiation before the thin film of active material is deposited thereon. The plasma irradiation may be carried out using a hydrogen or argon plasma, for example. The ion irradiation may be carried out using a hydrogen or argon ion, for example.

The thin film of active material, in the second aspect, may have a structure compositionally graded in its thickness direction.

The composition gradient may be formed while the thin film of active material is deposited.

The aforementioned graded structure may, for example, result from a varying concentration gradient of a current collector constituent diffusing into the thin film of active material. Specifically, diffusion of the current collector constituent into the thin film of active material results in the formation of a graded structure wherein a concentration of the current collector constituent is higher in the vicinity of the current collector and is lower at a location closer to the surface of the thin film of active material. The formation of such a graded structure in a diffusion region of the current collector constituent improves adhesion of the thin film of active material to the current collector. In the case where the current collector constituent diffused into the thin film of active material is a metal element that is not alloyable with lithium, the thin film of active material undergoes relatively reduced expansion and shrinkage as it stores and releases lithium. This reduces a stress produced in the vicinity of an interface between the thin film of active material and the current collector during expansion and shrinkage of the thin film, so that the thin film of active material while its volume expands or shrinks is prevented from separating from the current collector.

Also in the second aspect, an interlayer for improving adhesion may be provided to overlie the current collector and then the thin film of active material is deposited on the interlayer.

The interlayer may be deposited using a deposition process which supplies a raw material from a vapor phase, specifically by a CVD, sputtering, spraying or vapor evaporation process.

The aforementioned compositionally graded structure in the thin film of active material may result from a varying concentration gradient of an interlayer component diffused into the thin film of active material.

In the present invention, the current collector may be formed of copper, iron, nickel, stainless steel, molybdenum, tungsten, tantalum or carbon, for example.

In the present invention, the thickness of the current collector is not particularly specified, but may preferably be 50 $\mu$m or below, more preferably 20 $\mu$m or below.

Preferably, the current collector for use in the present invention has small surface irregularities. In specific, the current collector has a surface roughness Ra preferably in the range of 0.01–1 $\mu$m. The surface roughness Ra of the current collector is specified in Japanese Industrial Standards (JIS B 0601-1994) and can be measured as by a surface roughness meter, for example.

The electrode fabricated in accordance with the second aspect is also suitable for use as a negative electrode for a lithium battery, particularly suitable for use as a negative electrode for a rechargeable lithium battery.

A third aspect of the present invention is a method for preparing an electrode material for a lithium battery, characterized as including depositing, on a substrate, a thin film which consists substantially of a crystalline region and an amorphous region formed of a material similar or disimilar in type to that constituting the crystalline region, which stores and releases lithium and which serves as an active material.

One specific preparation method of the third aspect is characterized in that a thin film that serves as an active material is deposited on a substrate by supplying, either in the form of a gas or powder from a vapor phase, raw material containing the constituent atoms of the thin film.

Also in the third aspect, a hydrogen gas, in addition to the raw material in the form of a gas or powder, may be supplied during deposition of the thin film.

The thin film may be deposited by the process used in the first or second aspect.

In the third aspect, it is preferred that the amorphous regions are located to surround the crystalline region. It is also preferred that the crystalline region consists of fine crystal grains.

The crystalline region and/or amorphous region in the thin film of the third aspect may be composed of the same material as the thin film of the second aspect. Also in the third aspect, the pretreatment may be carried out before the thin film is deposited on a substrate, analogously to the first and second aspects.

The current collector for use in the third aspect may be similar in type to the current collector in the second aspect.

Also in the third aspect, an interlayer for improving adhesion may be provided to overlie the current collector and then the thin film is deposited on the interlayer, analogously to the first and second aspects.

A method of the present invention for constructing a lithium battery is characterized by the use of the electrode material prepared or the electrode fabricated in the first, second or third aspect for a negative electrode material or a negative electrode.

A method of the present invention for constructing a rechargeable lithium battery is characterized by the use of the electrode material prepared or the electrode fabricated in the first, second or third aspect for a negative electrode material or a negative electrode.

In the present invention, it is more preferred that the current collector and the substrate have surface roughnesses Ra in the range of 0.05–0.5 $\mu$m. The electrode active material, or the thin film of active material such as a noncrystalline silicon thin film may be doped with an impurity. Examples of such impurities include elements of the periodic Groups IIIB, IVB and VB, such as phorphorus, aluminum, arsenic, antimony, boron, gallium and indium.

Also in the present invention, the thin film of active material may be made up of a sequence of superimposed layers. The superimposed layers may differ from each other in terms of composition, crystallinity, impurity concentration, hydrogen concentration or the like. Such layers may provide a thin-film structure graded in its thickness direction, as described earlier. For example, such layers, if properly arranged, can provide a graded structure in which the composition, crystallinity, impurity concentration, hydrogen concentration or the like is varied in a thickness direction of the thin film.

In the present invention, the thickness of the thin film of active material is not particularly specified and may be up to 20 $\mu$m, for example. In order to obtain a high charge-discharge capacity, the thin film preferably has a thickness of at least 1 $\mu$m.

In the present invention, an interlayer may be provided between the thin film and the current collector or the substrate to improve adhesion of the thin film to the current collector or the substrate, as stated earlier. The useful interlayer may preferably be composed of a material which is alloyable with a material constituting the current collector or the substrate and with the active material.

In the present invention, the term "lithium battery" encompasses a lithium primary battery and a lithium secondary battery. Accordingly, the active electrode material of the present invention can be incorporated in a lithium secondary battery as well as in a lithium primary battery.

An electrolyte solvent for use in the rechargeable battery of the present invention is not particularly limited in type and is illustrated by a mixed solvent which contains cyclic carbonate such as ethylene carbonate, propylene carbonate or butylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane or a chain ester such as $\gamma$-butyrolactone, sulfolane or methyl acetate. Illustrative electrolyte solutes are $LiPF_6$, $LiPB_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}C_{12}$ and mixtures thereof. Other applicable electrolytes include a gelled polymer electrolyte comprised of an electrolyte solution impregnated into a polymer electrolyte such as polyethylene oxide, polyacrylonitrile or polyvinylidene fluoride; and inorganic solid electrolytes such as LiI and $Li_3N$, for example. The electrolyte for the rechargeable lithium battery of the present invention can be used without limitation, so long as an Li compound as its solute that imparts an ionic conductivity, as well as its solvent that dissolves and retains the Li compound, remain undecomposed at voltages during charge, discharge and storage of the battery.

Examples of positive active materials useful for incorporation in the rechargeable lithium battery of the present invention, include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}CO_{0.2}Mn_{0.1}O_2$; lithium-free metal oxides such as $MnO_2$; and the like. Other substances can also be used if they are capable of electrochemical insersion and release of lithium.

It is believed that the active electrode material of the present invention can also be used as an electrode active material for nonaqueous electrolyte batteries and nonaqueous electrolyte rechargeable batteries which contain electrode active materials capable of storing and releasing alkaline metals other than lithium, such as sodium and potassium, and alkaline earth metals such as magnesium and calcium.

BEST MODE FOR CARRYING OUT THE INVENTION

Figure 1:
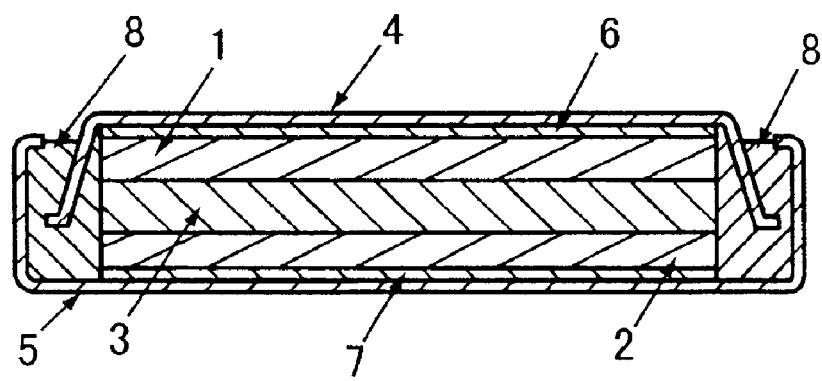
FIG. 1 is a schematic sectional view illustrating a rechargeable lithium battery constructed in Examples of the present invention.

The present invention is below described in more detail by way of examples. It should be understood that the present invention is by no means limited by the folloiwng examples, and suitable changes and modifications can be effected without departing from the scope of the present invention.

(Experiment 1)

Fabrication of Negative Electrode

A microcrystalline silicon thin film was deposited on a rolled copper foil (about 18 μm thick) as a substrate by a CVD process using silane ($SiH_4$) as a source gas and hydrogen as a carrier gas. Specifically, the copper foil as a substrate was placed on a heater within a reaction chamber and an interior of the reaction chamber was evacuated by a vacuum pumping apparatus to a pressure of 1 Pa or below. Thereafter, the silane ($SiH_4$) gas as a source gas, together with the hydrogen ($H_2$) gas as a carrier gas, were introduced from a source gas inlet port. The heater was then operated to heat the substrate to 180° C. The vacuum pumping apparatus was controlled to adjust a degree of vacuum to a reaction pressure, a radio frequency wave was generated by a radio frequency power supply, and the generated radio frequency wave was introduced from an electrode to induce a glow discharge. The details of the thin-film forming conditions are given in Table 1. In Table 1, the unit of flow rate, sccm, indicates a volumetric flow rate per minute ($cm^3$/minute) of a fluid at 0° C. at 1 atmospheric pressure (101.33 kPa) and is an abbreviation of standard cubic centimeters per minute.

TABLE 1

| Conditions | During Film Formation |
| --- | --- |
| Flow Rate of Silane ($SiH_4$) Gas | 10 sccm |
| Flow Rate of Carrier Gas ($H_2$) | 200 sccm |
| Substrate Temperature | 180° C. |
| Reaction Pressure | 40 Pa |
| RF Power | 555 W |

The microcrystalline silicon thin film was deposited under the above-specified conditions to a thickness of about 10 μm. The resulting thin film was found to be a silicon thin film formed of microcrystalline silicon which failed within the category of noncrystalline silicon. It was confirmed by the observation using an electron microscope that noncrystalline regions were located to surround a crystalline region consisting of fine crystal grains. A 17 mm diameter disc was punched out from the resulting sample to obtain an electrode a1.

Next, analogously to the above, a microcrystalline silicon thin film was deposited on a rolled copper foil by a sputtering process under the thin-film forming conditions specified in Table 2 to a thickness of about 10 μm. A disc was punched out from the resulting sample to provide an electrode a2, analogously to the above.

TABLE 2

| | During Film Formation |
| --- | --- |
| Flow Rate of Sputtering Gas (Ar) | 50 sccm |
| Flow Rate of Carrier Gas ($H_2$) | 200 sccm |
| Substrate Temperature | 200° C. |
| Reaction Pressure | 10 Pa |
| RF Power | 800 W |

Next, analogously to the above, a microcrystalline silicon thin film was deposited on a rolled copper foil by spraying process under the thin-film forming conditions specified in Table 3 to a thickness of about 10 μm. A disc was punched out from the resulting sample to provide an electrode a3, analogously to the above. In Table 3, the unit denoted by slm indicates a volumetric flow rate (1/min, 1 l/min=1,000 $cm^3$/minute) of a fluid at 0° C. at 1 atmospheric pressure (101.33 kPa) and is an acronym of standard liter per minute.

TABLE 3

| | During Film Formation |
| --- | --- |
| Si Powder | Grain Size 5 μm |
| Flow Rate of Carrier Gas (Ar) | 10 slm |
| Flow Rate of Carrier Gas ($H_2$) | 20 slm |
| Substrate Temperature | Room Temp. |
| Reaction Pressure | $2 \times 10^4$ Pa |
| RF Power | 10 kW |

Next, analogously to the above, a microcrystalline silicon thin film was deposited on a rolled copper foil by a vapor evaporation process to a thickness of about 10 μm. The thin film was deposited using an electron beam (EB) under the conditions of an unheated substrate temperature (about 40° C.) and a deposition rate of 1 nm/sec (10 Å/sec) without a gas supply. A disc was punched out from the resulting sample to provide an electrode a4, analogously to the above.

For a comparative purpose, 90 parts by weight of commercially available single crystal silicon powder (particle diameter of 10 μm) and 10 parts by weight of polytetrafluoroethylene as a binder were mixed and then pressed in a 17 mm diameter mold to obtain a pellet-form electrode b1.

(Fabrication of Positive Electrode)

Starting materials, $Li_2CO_3$ and $CoCO_3$, were weighed such that the atomic ratio of Li and Co, Li:Co, was brought to 1:1, and then mixed in a mortar. The mixture was pressed in a 17 mm diameter mold and calcined in the air at 800° C. for 24 hours to obtain a calcined product consisting of $LiCoO_2$. This was subsequently ground into particles with a mean particle diameter of 20 μm.

80 parts by weight of the resulting $LiCoO_2$ powder, 10 parts by weight of acetylene black as a conducting material and 10 parts by weight of polytetrafluoroethylene as a binder were mixed. The mixture was pressed in a 17 mm diameter mold to obtain a pellet-form positive electrode.

(Preparation of Electrolyte Solution)

1 mole/liter of $LiPF_6$ was dissolved in a mixed solvent containing equi-volumes of ethylene carbonate and diethyl carbonate to prepare an electrolyte solution for use in the following battery construction.

(Construction of Battery)

A coin type rechargeable lithium battery was constructed using the above-fabricated electrode a1, a2, a3, a4 or b1 for the negative electrode, and the above-fabricated positive electrode and the above-prepared electrolyte solution.

FIG. 1 is a schematic sectional view, illustrating a such-constructed rechargeable lithium battery which includes a positive electrode 1, a negative electrode 2, a separator 3, a positive can 4, a negative can 5, a positive current collector 6, a negative current collector 7 and an insulating gasket 8 made of polypropylene.

The positive electrode 1 and negative electrode 2 are disposed on opposite sides of the separator 3. These are enclosed in a battery case composed of the positive can 4 and negative can 5. The positive electrode 1 is connected to the positive can 4 by the positive current collector 6. The negative electrode 2 is connected to the negative can 5 by the negative current collector 7. Such construction enables charge and discharge as a secondary battery.

Batteries using the electrodes a1, a2, a3, a4 and b1 for their respective negative electrodes were designated as batteries A1, A2, A3, A4 and B1, respectively.

(Measurement of Charge-Discharge Cycle Life Performance)

Each battery, excepting the battery B1, was charged at a current of 100 µA at 25° C. to a negative electrode capacity of 2,000 mAH/g and then discharged. This unit charge-discharge cycle was repeated to measure a 50th-cycle capacity retention rate for each battery. The battery B1, which could not be charged to 2,000 mAh/g, was subjected to a cycle test wherein it was charged to 4.2 V and then discharged on each cycle. The results are shown in Table 4.

TABLE 4

| Battery | Negative Active Material | 50th-Cycle Capacity Retention Rate |
|---|---|---|
| A1 | Microcrystalline Silicon Deposited by CVD | 85% |
| A2 | Microcrystalline Silicon Deposited by Sputtering | 78% |
| A3 | Microcrystalline Silicon Deposited by Spraying | 43% |
| A4 | Microcrystalline Silicon Deposited by Vapor Evaporation | 50% |
| B1 | Silicon Powder | 5% |

As clear from the results shown in Table 4, the batteries A1, A2, A3 and A4, respectively constructed in accordance with the present invention, exhibit the markedly increased capacity retention rates compared to the comparative battery B1.

For the electrodes incorporated in the batteries A1 and A2, the diffusion of copper atoms into the silicon thin film was measured by SIMS. It was confirmed from the measurement results that the copper atoms were diffused into the thin film to the extent that show a concentration of about several % at a location about 1 µm away from an interface.

As described above, the microcrystalline silicon thin film obtained in accordance with the preparation method of the present invention, when used for the negative active material of a rechargeable lithium battery, provides a marked improvement of charge-discharge cycle characteristics of the battery. Although the detailed mechanism of this improvement is not clear, it is assumed that the amorphous region in the microcrystalline silicon thin film relaxes expansion and shrinkage of the thin film while storing and releasing lithium to prevent the negative active material from being pulverized, and that the graded structure improves adhesion to thereby suppresses the reduction of a current collecting performance.

(Experiment 2)

A substrate, i.e., a copper foil was treated at its surface by plasma or ion irradiation, prior to deposition of a microcrystalline silicon thin film thereon, to study the effect of this pretreatment. A rolled copper foil similar in type to that used in Experiment 1 was employed to serve as the substrate.

(Pretreatment by Plasma Irradiation)

The copper foil serving as the substrate was placed on a heater within a reaction chamber and then an interior of the reaction chamber was evacuated by a vacuum pumping apparatus to a pressure of 1 Pa or below, analogously to the procedure used to fabricate the electrode a1 in Experiment 1. Subsequently, a hydrogen ($H_2$) gas at a flow rate of 200 sccm was introduced into the reaction chamber. The heater was operated to heat the substrate to 180° C. Then, a 555 W ratio-frequency power was applied to produce a hydrogen plasma with which the copper foil was irradiated for 10 minutes. Thereafter, a microcrystalline silicon thin film was deposited on the copper foil by a CVD process to a thickness of about 10 µm, analogously to the procedure used to fabricate the electrode a1 in Experiment 1. Analogously to the above-described Experiment 1, a disc was punched out from the resulting sample to obtain an electrode a5.

(Pretreatment by Ion Irradiation)

An argon (Ar) gas and a hydrogen ($H_2$) gas, each at a flow rate of 200 sccm, were introduced into a reaction chamber similar in construction to that used in the pretreatment by plasma irradiation. An RF power from a radio-frequency power supply installed separately from the one for plasma production was applied to the substrate to generate a bias voltage of −50 V across the substrate. A plasma was produced under the conditions of a substrate temperature of 180° C. and an RF power of 555 W to thereby irradiate the copper foil with ions for 10 minutes. After this pretreatment, a microcrystalline silicon thin film was deposited on the copper foil by a CVD process to a thickness of about 10 µm, analogously to the procedure used to fabricate the electrode a1 in Experiment 1. Analogously to Experiment 1, a disc was punched out from the resulting sample to obtain an electrode a6.

The obtained electrodes a5 and a6, as well as the electrode a1 obtained in the above Experiment 1, were subjected to an adhesion evaluation test. A load of 1 kg was applied to each microcrystalline silicon thin film using an indentation tester with a Vickers penetrator. 100 pieces in total were tested for each battery. The number of pieces that showed separation, out of 100 pieces, was counted to determine a percentage occurrence of separation. The results are given in Table 5.

By using the electrodes a5 and a6, batteries A5 and A6 were constructed in the same manner as in Experiment 1. These were evaluated for charge-discharge cycle performance characteristics in accordance with the procedure described in Experiment 1. The evaluation results are shown in Table 5. In Table 5, the results obtained for the battery A1 is also given.

TABLE 5

| Battery (Electrode) | Pretreatment | Adhesion (% Occurrence of Separation) | 50th-Cycle Capacity Retention Rate |
|---|---|---|---|
| A5(a5) | Plasma Treatment | 7% | 91% |
| A6(a6) | Ion Irradiation | 6% | 92% |
| A1(a1) | Absent | 24% | 85% |

As can be clearly seen from the results shown in Table 5, the pretreatment such as plasma or ion treatment improves adhesion of the silicon thin film to the copper foil in the electrode. Also, the batteries A5 and A6 incorporating the pretreated electrodes a5 and a6 exhibit the improved charge-discharge cycle characteristics compared to the battery A1 incorporating the untreated electrode a1. This is probably due to the improved adhesion of the silicon thin film to the copper foil, which further suppressed separation of the negative active material from the copper foil during charge and discharge.

While the rolled copper foil was used for the copper foil in the above Experiments, it has been confirmed that the similar effect of the pretreatment is also obtained for an electrolytic cpper foil with a higher surface roughness Ra.

Utility in Industry

In accordance with the present invention, an electrode material can be prepared which enables a rechargeable lithium battery to exhibit a high charge-discharge capacity and superior charge-discharge cycle characteristics.

What is claimed is:

1. A method for constructing a rechargeable lithium battery comprising:

pretreating a surface of a current collector by plasma or ion irradiation;

depositing on said pretreated current collector a thin film of active material that is alloyable with lithium by a thin-film forming process which supplies raw material from a vapor phase, to fabricate an electrode;

forming a negative electrode from said electrode; and assembling said negative electrode, a positive electrode and an electrolyte into a rechargeable lithium battery.

2. The method for constructing a rechargeable lithium battery as recited in claim 1, characterized in that said thin-film forming process is a CVD, sputtering, spraying or vapor evaporation process.

3. The method for constructing a rechargeable lithium battery as recited in claim 1, characterized in that said thin film of active material is composed of at least one material that can produce compounds or solid solutions with lithium, selected from elements from Groups IIB, IIIB, IVB and VB of the periodic table, and oxides and sulfides of transition metal elements from Periods 4, 5 and 6 of the periodic table.

4. The method for constructing a rechargeable lithium battery as recited in claim 3, characterized in that said element is at least one selected from carbon, silicon, germanium, tin, lead, aluminum, indium, zinc, cadmium, bismuth and mercury.

5. The method for constructing a rechargeable lithium battery as recited in claim 1, characterized in that said thin film of active material is a noncrystalline thin film.

6. The method for constructing a rechargeable lithium battery as recited in claim 1, characterized in that said thin film of active material is a noncrystalline silicon thin film.

7. The method for constructing a rechargeable lithium battery as recited in claim 6, characterized in that said noncrystalline silicon thin film is a microcrystalline silicon thin film.

8. The method for constructing a rechargeable lithium battery as recited in claim 1, characterized in that said thin film of active material is a noncrystalline germanium, microcrystalline germanium, amorphous germanium, noncrystalline silicon-germanium alloy, microcrystalline silicon-germanium alloy or amorphous silicon-germanium alloy thin film.

9. The method for constructing a rechargeable lithium battery as recited in claim 1, characterized in that said plasma irradiation is carried out using a hydrogen or argon plasma and said ion irradiation is carried out using a hydrogen or argon ion.

10. The method for constructing a rechargeable lithium battery as recited in claim 1, characterized in that said thin film of active material has a structure graded in composition in its thickness direction.

11. The method for constructing a rechargeable lithium battery as recited in claim 10, characterized in that said compositionally graded structure is formed while said thin film of active material is deposited.

12. The method for constructing a rechargeable lithium battery as recited in claim 10, characterized in that said compositionally graded structure results from a varying concentration gradient of a constituent of said current collector that diffused into said thin film of active material.

13. The method for constructing a rechargeable lithium battery as recited in claim 1, characterized in that an interlayer for improving adhesion is provided to overlie said current collector and then said thin film of active material is deposited on the interlayer.

14. The method for constructing a rechargeable lithium battery as recited in claim 13, characterized in that said interlayer is provided by a thin-film forming process which supplies raw material from a vapor phase.

15. The method for constructing a rechargeable lithium battery as recited in claim 13, characterized in that said compositionally graded structure results from a varying concentration gradient of a component of said interlayer that diffused into said thin film of active material.

16. The method for constructing a rechargeable lithium battery as recited in claim 1, characterized in that said current collector is composed of copper, iron, nickel, stainless steel, molybdenum, tungsten, tantalum or carbon.

17. The method for constructing a rechargeable lithium battery as recited in claim 1, characterized in that said current collector has a thickness of 50 $\mu$m or below.

18. The method for constructing a rechargeable lithium battery as recited in claim 1, characterized in that said current collector has small surface irregularities.

19. The method for constructing a rechargeable lithium battery as recited in claim 18, characterized in that said current collector has a surface roughness Ra in the range of 0.01–1 $\mu$m.

* * * * *

UNITED STATES PATENT AND TRADEMARK OFFICE
CERTIFICATE OF CORRECTION

PATENT NO. : 6,887,511 B1
DATED : May 3, 2005
INVENTOR(S) : Masaki Shima et al.

It is certified that error appears in the above-identified patent and that said Letters Patent is hereby corrected as shown below:

Title page,
Item [56], References Cited, FOREIGN PATENT DOCUMENTS, insert:
-- JP  7-29602 A         1/1995
   JP  2000-285919 A    10/2000
   JP  2000-12088 A      1/2000
   JP  4-79293 A         3/1992
   JP  6-299319 A       10/1994
   JP  8-3741 A          1/1996
   JP  8-239750 A        9/1996
   JP  10-199524 A       7/1998
   JP  11-135115 A       5/1999
   JP  11-185744 A       7/1999
   JP  8-50922 A         2/1996 --.
OTHER PATENT DOCUMENTS, insert:
-- Bourderau, S. et al., "Amorphous Silicon as a Possible Anode Material for Li-ion Batteries", *Journal of Power Sources*, vol. 81-82, pp. 233-236, 1999. --.

Signed and Sealed this

Twenty-first Day of February, 2006

JON W. DUDAS
*Director of the United States Patent and Trademark Office*